United States Patent [19]

Ziems

[11] 4,266,466
[45] May 12, 1981

[54] HYDRAULIC VALVE DEVICE

[75] Inventor: Horst Ziems, Harsewinkel, Fed. Rep. of Germany

[73] Assignee: The Claas OGH, Harsewinkel, Fed. Rep. of Germany

[21] Appl. No.: 855,865

[22] Filed: Nov. 30, 1977

[30] Foreign Application Priority Data

Dec. 1, 1976 [DE] Fed. Rep. of Germany ....... 2654366

[51] Int. Cl.³ .......................................... F15B 13/042
[52] U.S. Cl. ...................................... 91/420; 91/445; 91/454; 91/459; 137/110
[58] Field of Search ................. 91/420, 445, 454, 459; 137/110, 106, 87, 596.15, 596.12, 596.18; 60/468, 494; 251/333

[56] References Cited

U.S. PATENT DOCUMENTS

| 2,286,880 | 6/1942 | Traut | 91/420 X |
|---|---|---|---|
| 2,672,731 | 3/1954 | Ashton | 91/420 X |
| 2,861,550 | 11/1958 | Hanna et al. | 91/454 X |
| 2,984,257 | 5/1961 | McCormick et al. | 137/596.15 |
| 3,169,453 | 2/1965 | Westveer | 91/420 |
| 3,186,430 | 6/1965 | Koutnik | 251/333 X |
| 3,665,810 | 5/1972 | Parrftt | 91/420 |
| 3,738,227 | 6/1973 | Bitzer et al. | 91/459 X |
| 3,908,383 | 9/1975 | Selden | 91/420 X |

FOREIGN PATENT DOCUMENTS

| 1284231 | 2/1969 | Fed. Rep. of Germany | 137/596.15 |
|---|---|---|---|
| 1249404 | 11/1960 | France | 91/420 |

Primary Examiner—Irwin C. Cohen
Attorney, Agent, or Firm—Pollock, Vande Sande & Priddy

[57] ABSTRACT

A hydraulic valve device for controlling a double action, piston-type servomotor adaptable for steering a self-propelled agricultural vehicle and including a pair of identical interconnected valve groups, with each group connected to an opposite side of the servomotor and further connected to a source of pressurized fluid and an exhaust outlet, whereby selective actuation of the hydraulic device creates a pressure difference in a servomotor forcing the piston to move in a predetermined direction.

13 Claims, 1 Drawing Figure

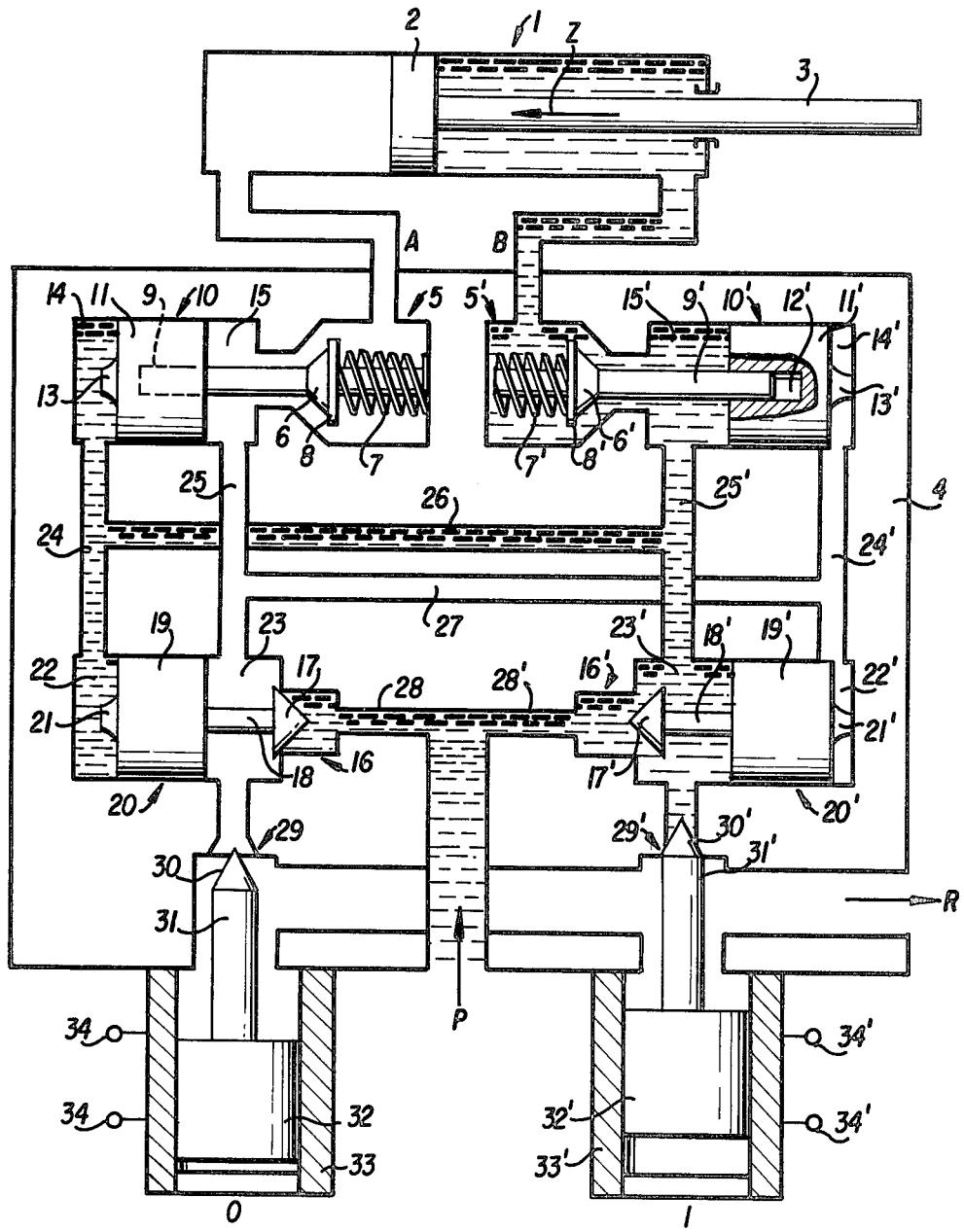

HYDRAULIC VALVE DEVICE

BACKGROUND OF THE INVENTION

The invention described in the present application concerns a novel hydraulic valve device for controlling a double action servomotor. The servomotor is, in turn, adaptable for use in the automatic steering assembly of a self-propelled, agricultural vehicle set as a harvester which also includes a guidance system for sensing rows of plants, furrows, or similar guide references.

Known hydraulic valve assemblies of this type include four separate pressure line connections which are engageable in a predetermined manner in response to selective positioning of the hydraulic control valve into one of three control positions. The four separate pressure line connections provide a cumbersome valve device, which is relatively costly to manufacture and has an increased susceptibility to accidental hydraulic fluid leakage.

In comparison, the hydraulic device of the present invention eliminates these problems by including only two interconnected pressure line connections that may be engaged or disengaged responsive to the selective positioning of the hydraulic valve device.

Existing hydraulic valve devices often include either a piston or slide assembly to control the position of the servomotor. The piston is formed with a plurality of radial grooves arranged to direct the flow of hydraulic fluid through the valve in accordance with the predetermined control positions. Because the radial grooves function as control surfaces, it is necessary that the piston include a costly high quality surface finish. There must also be a certain amount of free play between the piston and its surrounding cylinder to avoid jamming as a result of any thermal expansion which might take place. Because of this, it is inevitable that there will be some seepage as the hydraulic fluid is forced past the piston, thereby reducing the volumetric effectiveness. Apart from this, the hydraulic fluid which has leaked through the valve assembly must be drained and when a piston is used in the hydraulic control device, special arrangements must be made to reduce any sudden pressure build-up of hydraulic fluid which might take place during the switching movement. As a result, the control edges of the piston are often notched to direct some of the hydraulic fluid from the pressure line connection into the return line connection during the switching movement.

It is evident that the effectiveness of such a piston assembly is thereby heavily dependent upon the purity of the hydraulic fluid. Foreign bodies in the hydraulic fluid, which in most cases is hydraulic oil, can quickly lead to "dragging" of the valve piston. This condition is especially disadvantageous for vehicle steering mechanisms, because the steering can be turned suddenly to its maximum angle without the possibility of rapid correction which increases the possibility of a dangerous accident.

SUMMARY OF THE INVENTION

Thus, an object of the invention is to provide a novel hydraulic valve device which is practically insensitive to foreign bodies in the hydraulic fluid and is capable of operating with a very small inertia loss, thereby allowing the hydraulic valve device to be used in a sensitive control circuit such as an automatic steering mechanism.

Another object of the present invention is to provide a hydraulic valve device which can be used in agricultural systems in which a single servomotor is operated from two independent control circuits, as is the case with a vehicle steering mechanism including both automatic and emergency manual control circuits.

The hydraulic valve device of the present invention includes two valve groups, with each group being interconnected by a separate power line connection between a constant delivery pump, a double action servomotor, and a nearly pressureless return line. Each valve group includes a back pressure valve which is unseated by a difference between the input and exhaust pressure in a direction away from the fluid passage leading into the servomotor, an input valve which is closed by this pressure difference, and an exhaust valve which is externally controlled by either an electromagnetic or mechanical system. When one of two exhaust stop valves is selectively closed, a build-up of pressure actuates the remaining valves in a manner resulting in a pressure difference being created within the servomotor which forces the piston to move in a predetermined direction.

A unique advantage of the present invention resides in the fact that the two valve groups are so interdependently controlled, that while the oil flow may be reduced or redirected, it may not be suddenly blocked or reversed. This prevents large fluid pressure from being directed suddenly into the servomotor. In the event that the operation of one of the exhaust stop valves fails to completely block flow of hydraulic fluid, the stop pressure necessary for operating the remaining valves is, nevertheless, sufficient to operate the servomotor as required. Because of the interrelated pressure line connections, defects in any of the individual valves will not prevent the hydraulic valve device from controlling the operation of the servomotor. In a similar manner, foreign bodies which may be deposited on the seats of the individual valves would be washed out during the subsequent switching operation, thereby eliminating the possibility of jamming the entire hydraulic valve device.

BRIEF DESCRIPTION OF THE DRAWING

The single figure discloses a schematic representation of the hydraulic valve device of the present invention.

DETAILED DESCRIPTION OF THE PREFERRED EMBODIMENT

Referring now to the drawing, there is shown a servomotor 1, adaptable for use in a vehicle steering mechanism and further including a piston 2 attached to a piston rod 3. Piston 2 is movable in two directions responsive to hydraulic fluid being selectively introduced into servomotor 1. The piston rod 3, in turn, is mechanically connected to the steering mechanism of a self-propelled vehicle, such as a harvester, not shown in the drawing.

The servomotor 1 is controlled by the hydraulic valve device comprising the present invention which is compactly arranged within a block 4. Block 4 further includes two separate pressure line connections A and B joining servomotor 1, a pump P which provides a source of pressurized fluid (hereafter titled input P), and an exhaust connection R.

It is the purpose of the hydraulic valve device of the present invention to selectively interconnect the input P, the servomotor 1, and the exhaust R when the hydraulic valve device moves into one of three predetermined positions. When the control device is moved into a first or neutral position, the input P is directly connected to exhaust R preventing the build-up of fluid pressure within servomotor 1. Moving the hydraulic valve into a second position completes a fluid passageway between input P and pressure line connection A while simultaneously completing a fluid passageway between pressure line connection B and exhaust R. Further movement of the hydraulic valve device into a third position, shown in the drawing, completes a fluid passageway between input P and pressure line connection B, while simultaneously completing a fluid passageway between pressure line connection A and exhaust R. When the control device is selectively moved into the third position, the piston 2 is forced to move in the direction of the arrow Z, i.e., towards the left of the page.

The hydraulic valve device of the present invention consists of two separate symmetrically arranged valve groups, with each of the groups inter-engaged with one of the pressure line connections A or B, respectively. In the following description, similar elements in each of the valve groups have been given the same number, except that the elements of the B group include an additional prime designation (') for purposes of clarity. Furthermore, because the two valve groups are identical, only the three individual valves associated with the pressure line connection A have been described in detail.

A back pressure valve 5 is positioned within a fluid conduit extending from one end of servomotor 1 into a cylinder 10. A control piston 11 is positioned in the cylinder 10 and includes a connecting rod 9 which is fixed to the end of a valve head 6. The control piston 11 further includes a bore hole 12 (shown at 12') facing the valve head 6, and into which the rod 9 is freely slidable, thereby allowing control piston 11 free sliding movement relative to the rod 9 in a direction away from the valve head 6. Likewise, the rod 9 and attached valve head 6 is capable of sliding movement relative to the control piston 11 in a direction resulting in the opening of back pressure valve 5. Control piston 11 further includes a boss 13 adaptable for abutment with an end wall of cylinder 10 to prevent piston 11 from completely filling a chamber 14 formed by cylinder 10 and piston 11. A second chamber 15 is formed by the cylinder 10 and an opposite side of piston 11.

Both chambers 14 and 15 are connected to outlet passageways allowing hydraulic fluid to act on both sides of control piston 11 as required. As fluid pressure builds up in chamber 14, control piston 11 is forced to move in the direction of back pressure valve 5 resulting in the piston 11 abutting connecting rod 9 positioned within bore 12. Further movement of control piston 11 operates to move connecting rod 9 and attached valve head 6 against the force of restraining spring 7 opening back pressure valve 5.

Each of the pressure line connections A and B includes an input valve 16 and 16', respectively. Input valve 16 is preferably formed with a conical valve head 17 and is attached to an inlet control piston 19 for a valve stem 18. The inlet piston 19, in turn, is positioned within an inlet cylinder 20 which includes a pair of chambers 22 and 23 formed between the side walls of piston 19 and the corresponding end walls of cylinder 20. A boss 21 is provided on a face of inlet control piston 19 that is adaptable for abutment with an end wall of cylinder 20 preventing the complete filling of chamber 22 by piston 19. The inlet control piston 19 may be rigidly connected to the stem 18 or the piston 19 and stem 18 may be joined by a sliding connection in a manner similar to the connection between piston 11 and rod 9.

The chamber 22 is connected via a passageway 24 with chamber 14, while a second passageway 25 connects chambers 15 and 23.

In the embodiment shown, passageway 25', associated with pressure line connection B, is connected via a balance passageway 26 to passageway 24 associated with pressure line connection A. Likewise, a balance passageway 27 connects passageway 25 with passageway 24'. As shown in the drawing, balance passageways 26 and 27 may be situated between connecting passageways 24 and 25' of the opposing valve groups.

The inlet sides of the two input valves 16 and 16' are connected to a common throttle section 28 of the pump line input connection P.

The two valve groups further include exhaust stop valves 29 and 29' joining pressure line connections A and B, respectively, with exhaust outlet R. Exhaust stop valve 29, including a preferably conically-shaped valve head 30, is positioned within chamber 23 adjacent the inlet control cylinder 20.

The exhaust stop valve 29 may be electromagnetically operated, wherein valve head 30 is connected through a stem 31 to a magnet plunger 32 slidable within a magnetic coil 33. Magnetic coil 33 includes electrical connections 34 adaptable for connection to an electrical control system. A single-stroke magnet is sufficient with the return motion of the plunger 32 being actuated either electrically or by means of spring tension.

When the exhaust stop valve 29 is in the first or neutral position, the passageways 23 and 23' are directly connected with exhaust outlet R preventing the build-up of hydraulic fluid within servomotor 1.

Actuation of the hydraulic valve device resulting in the movement of servomotor 1, can be externally effected only through the control of exhaust stop valves 29 and 20'. When the hydraulic valve device is in the neutral position, the two exhaust stop valves 29 and 29' will remain open, while the two back pressure valves 5 and 5' are closed due to the presence of restraining springs 7 and 7', respectively. This prevents the accidental movement of piston 2 within servomotor 1.

Because of the possibility that impurities in the hydraulic oil might prevent the proper seating of valve head 6, an additional sealing membrane 8 is positioned on connecting rod 9 adjacent to valve head 6. Sealing membrane 8 insures that back pressure valve 5 will function correctly whether or not valve head 6 is properly seated. As, for example, a splinter may form on the valve seat portion of back pressure valve 5 preventing the proper seating of valve head 6 and resulting in undesirable leakage. This situation is eliminated in the present invention, because of the additional sealing effect provided by membrane 8.

When the hydraulic valve device of the present invention is in the neutral setting, a balanced condition exists between the two valve groups associated with the respective pressure line connections A and B, wherein the input valves 16 and 16' are in a "floating condition" with the respective valve heads 17 and 17' being in the open position. The input P is connectable with exhaust outlet R via the open throttle section 28, input valves 16 and 16', and exhaust stop valves 29 and 29', respectively. Except for the build-up of fluid pressure in the throttle section 28, the hydraulic oil is returned in an almost pressureless state to the exhaust outlet R.

The operation of the hydraulic valve device according to the present invention will be now described.

Selective actuation of exhaust stop valve 29' results in the individual valves of the present invention assuming the positions shown in the drawing. The closure of exhaust valve 29' prevents the flow of hydraulic fluid from passageway 25' into exhaust outlet R. This results in an immediate pressure build-up in front of valve head 30' and extending through chamber 23 and passageway 25 to chamber 15 formed in control cylinder 10.

The increased fluid pressure also extends through balance passageway 26 and into passageway 24. Because only exhaust valve 29' has been closed, passageways 25, 27 and 24' remain in fluid contact with exhaust outlet R through the open exhaust stop valve 29. Because pistons 11 and 19 are formed with a greater diameter than valve heads 6 and 17, as shown in the drawing, the cross-sectional areas of pistons 11 and 19 will be greater than the cross-sectional areas of valve heads 6 and 17, respectively, and a pressure difference is created by the closing of stop valve 29' which forces pistons 11 and 19 to move within cylinders 10 and 20, respectively. As a result, input valve 16 is forced to close, while input valve 16' remains open. The increased fluid pressure in chamber 14 forces piston 11 to move in the direction of chamber 15, which via connecting rod 9 also moves valve head 6 against compression spring 7 opening back pressure valve 5.

In a similar manner, the increased fluid pressure in passageway 25' extends into chamber 15' forcing the movement of cylinder 11' until the abutment 13' contacts the wall of cylinder 10'. The increased fluid pressure in chamber 15' further forces the connecting rod 9' and attached valve head 6' to move against compression spring 7' opening back pressure valve 5'. In this manner, hydraulic fluid is allowed to flow through pressure line connection B into servomotor 1, wherein piston 2 is forced to move in the direction of the arrow Z.

For a better illustration, the passageways containing relatively high pressure hydraulic fluid are shown in the drawing with cross-line hatching, whereas the passageways containing relatively low pressure hydraulic fluid are shown with simple hatching.

Upon reopening of exhaust stop valve 29', passageways 25' and 24 are again directly connected with exhaust outlet R reducing the fluid pressure within the hydraulic valve device which allows back pressure valve 5' to close and input valve 16 to reopen. The back pressure valve 5 will also close because of the action of restraining spring 7.

If, on the other hand, exhaust valve 29 were initially closed, a pressure distribution and valve positioning symmetrical to the positioning shown in the drawing, would take place. Input valve 16 would remain open, while the pressure difference created by piston 19' having a greater diameter than valve head 17' as clearly shown in the drawing would force input valve 16' to close. The two back pressure valves 5 and 5' would remain open, with the two pressure line connections A and B being engaged with the input P and exhaust R, respectively.

The strokes of input valve 16 and back pressure valve 5 require only a few milliseconds, which result in the flow of oil through the passageways being almost instantaneous as long as the exhaust stop valve 29 remains closed. Apart from the pure switching function, the manner of operation of the hydraulic valve device of the present invention is especially versatile, in that the exhaust stop valve 29 can be controlled by merely limiting the strength of electric current passing through magnetic coil 33.

In order to insure a proper operation of the hydraulic valve device, it is advantageous to use tubular sections of relatively large internal diameter in forming the balance passageways 26 and 27, respectively. It is further advantageous to position the two valves groups such that a substantial reaction pressure must be overcome before closure of the various valves which prevents the entrance of air into the hydraulic system.

It is important to note that the operation of the hydraulic valve device is not adversely influenced by impurities which might temporarily become lodged in any of the various valve seats. Even if a splinter should become lodged in exhaust stop valve 29, the interconnected valve system will retain sufficient fluid pressure to operate servomotor 1. The same result is true in the event of leakage around input valve 16, whereby the subsequent movement of valve 16 in the opposite direction would act to dislodge any foreign body caught in the valve assembly.

A further novel aspect of the present invention resides in the particular structure of exhaust stop valve 29. It has already been stated that in a preferred embodiment of the invention conically shaped valve heads 30 may be used to open or close exhaust stop valve 29. Such a conical valve head 30 can be set not only in an open or closed position, but is also functional when in a partially open position, whereby the conical valve head 30 performs a throttling function. When using a suitable electromagnetic or mechanical control device, the stop valve 29 may be adapted for use in control circuits of a sensitive nature. For this purpose, the simple magnet plungers 32 are especially advantageous, in that exhaust stop valve 29 can be effectively throttled by selectively changing the proportion of current flowing through magnet coil 33. Because the exhaust stop valve 29 can be effectively throttled, any specific pressure can be maintained within pressure line connections A and B.

The exhaust stop valve 29 provided in the present hydraulic valve device also has an especially short operating time. This is due to the fact that pressure line connections A and B are initially maintained in a nearly pressureless state, with a build-up of pressure occurring upon actuation of exhaust stop valve 29. By the selection of suitable electromagnets, operating time of a few milliseconds can be achieved. This is to be compared with sliding valves, wherein the piston is usually moved in opposition to the force of a spring which requires a much longer operating time.

Even though the operation of the servomotor 1 does not start with a sudden bang, this does not mean that any extended delay will occur between the operation of the exhaust stop valve 29 and servomotor 1. Because the size of the control cylinder 10 and the inlet cylinder 20 can be kept very small, and are not substantially enlarged by the movement of the control piston 11 or the inlet control piston 19, the power from the pump P is almost immediately effective on the piston 2 of the servomotor 1. Most important of all, the input from the pump P is not momentarily interrupted producing undesirable pressure waves within the valve system.

The valve system according to the present invention is especially suitable for automatic steering on machines such as agricultural harvesters, either self-propelled or of the trailer type. As the harvester moves along the rows of crop plants, furrow edges or other references, the automatic guide sensor selectively relays electrical signals to connections 34 for operation of the proper valve group and subsequent movement of piston 2 within servomotor 1. The hydraulic valve device is adaptable for either manual or automatic control and in the event that no signal is given by the automatic control system, both sides of the servomotor 1 remain blocked to maintain the vehicle on course.

The embodiments described in the foregoing specification and shown in the drawing are to be regarded as nonlimiting examples, which can be altered and completed in any way within the scope of the invention.

What I claim is:

1. A hydraulic valve control device and servomotor system comprising:

a first fluid passageway assembly having a first end portion in joint fluid communication with a source of pressurized fluid and an exhaust passageway of a fluid reservoir or the like;

said first fluid passageway assembly having a second end portion in fluid communication with one of two chambers formed end to end within a servomotor housing, said chambers being separated from one another by a piston slidably mounted within said housing;

a second fluid passageway also having a first end portion in joint fluid communication with a source of pressurized fluid and an exhaust passageway of said fluid reservoir or the like;

said second fluid passageway assembly also having a second end portion in fluid communication with a remaining one of said two chambers formed within said servomotor housing;

said first fluid passageway assembly further including an intermediate portion forming a fluid passageway between said first and second end portions of said first fluid passageway assembly, respectively, with said intermediate portion also in fluid communication with a first end portion of each of a first and second separate fluid chambers;

said second fluid passageway assembly further including an intermediate portion forming a fluid passageway between said first and second end portions of said second fluid passageway assembly, respectively, with said intermediate portion also in fluid communication with a first end portion of each of a third and fourth separate fluid chambers;

a first conduit assembly providing a fluid-tight passageway between said intermediate portion of said second fluid passageway assembly and a second end portion of each of said first and second fluid chambers, respectively, and a second conduit assembly providing a fluid-tight passageway between said intermediate portion of said first fluid passageway assembly and a second end portion of each of said third and fourth fluid chambers, with each of said first, second, third and fourth chambers including a separate slidable piston member providing a fluid-tight seal between said first and second end portions respectively, said piston member in each of said first and third chambers controlling a normally open input valve means, said piston member in each of said second and fourth chambers controlling a normally closed back pressure valve means, separate normally open exhaust valve means positioned adjacent each fluid passageway assembly for selectively blocking a portion of a respective fluid passageway joining an exhaust passageway to prevent pressurized fluid from flowing directly into said exhaust passageway;

whereupon selective actuation of one of said separate exhaust valve means results in blockage of the flow of fluid from one fluid passageway assembly into an attached exhaust passageway, causing pressurized fluid to flow through said one fluid passageway assembly and into a chamber of said servomotor, said pressurized fluid also flowing into the end portions of both said fluid chambers joining said remaining fluid passageway assembly to moveably actuate the slidable pistons located therein, with one of said slidable pistons biasing an attached normally open input valve means into contact with said first end portion to block the flow of pressurized fluid into said remaining fluid passageway assembly and the further slidable piston engaging and moveably biasing a normally closed back pressure valve means out of contact with a second end portion of said remaining fluid passageway assembly to allow fluid to flow from a remaining chamber of said servomotor, through said remaining fluid passageway assembly and into a remaining attached exhaust passageway.

2. An apparatus according to claim 1, wherein each of said input valve means comprises a valve head of substantially conical configuration and an elongated stem member attached at one end to said conical valve head, with said stem member including an opposite end portion fixedly attached to one of said piston members located within said first and third chambers, respectively.

3. An apparatus according to claim 1, wherein each of said back pressure valve means comprises a substantially conically-shaped valve head having an elongated stem extending from said valve head into sliding contact with a bore formed in one of said piston members located in said second and fourth chambers, respectively, each back pressure valve means further including a separate resistance spring member positioned between each one of said conically-shaped valve heads and an opposite wall of a surrounding fluid passageway assembly, whereby each spring member biases a conically-shaped valve head into contact with an interior wall surface of said surrounding fluid passageway assembly to block the flow of pressurized fluid therethrough.

4. An apparatus according to claim 1, wherein said first and third fluid chambers are each positioned adjacent a first end portion of one of said first and second fluid passageway assemblies, respectively, and said second and fourth fluid chambers are each positioned adjacent a second end portion of one of said first and second fluid passageway assemblies, respectively, wherein each input valve means selectively blocks a first end portion of one of said fluid passageway assemblies and each back pressure valve means selectively blocks a second end portion of one of said fluid passageway assemblies.

5. An apparatus according to claim 1, wherein said separate exhaust valve means comprises a pair of exhaust valve assemblies each comprising plunger and attached valve head assembly slidably positioned within a magnetic coil, with each of said exhaust valve assemblies being energized by a current passing through said coil to move said plunger and attached valve head into a position for blocking fluid from passing from one of said fluid passageway assemblies into an attached exhaust passageway.

6. An apparatus according to claim 5, wherein said valve head is formed with a conically shaped end portion.

7. An apparatus according to claim 5, wherein each valve head moves a distance directly proportional to the strength of the current flowing through said magnetic coil.

8. An apparatus according to claim 3, wherein a sealing membrane is positioned between said valve head and said restraining spring in each of the back pressure valve assemblies.

9. An apparatus according to claim 1, wherein hydraulic valve control device is positioned within a common unitary block assembly.

10. An open center hydraulic valve control device for selectively diverting a continuously flowing stream of pressurized fluid into one of two chambers formed in a double action piston type servomotor in fluid-tight attachment with said hydraulic valve control device, and comprising:

first and second connecting passageways each having a first end defining a juncture in joint fluid communication with a source of continuously flowing pressurized fluid and a separate exhaust passageway joining a fluid reservoir or the like;

each of said first and second connecting passageways further including a second end portion in fluid communication with a separate one of two chambers formed in a servomotor housing, wherein a slidable piston member is positioned between and divides said two chambers one from the other;

separate fluid pressure responsive input valve means slidably mounted in each of said first and second connecting passageways and each input valve means including an end portion extending within and normally biased out of contact with an interior wall surface of a respective first end juncture to allow pressurized fluid to flow therethrough;

separate fluid pressure responsive back pressure valve means slidably mounted in each of said first and second connecting passageways and each back pressure valve means including an end portion normally biased into contact with an interior surface wall of a respective second end portion to prevent pressurized fluid from flowing out of an attached chamber of said servomotor;

separate exhaust valve means slidably mounted adjacent each of said first and second connecting passageways and each exhaust valve means including an end portion surrounded by and normally biased out of contact with a further interior wall surface of a respective first end juncture to allow pressurized fluid to flow through each respective juncture and directly into an attached exhaust passageway;

first means having an end in fluid attachment with said first connecting passageway and a further end in joint fluid attachment with the input valve means and back pressure valve means slidably received in said second connecting passageway for conveying pressurized fluid from said first connecting passage to said fluid attached input valve means and back pressure valve means in response to selective actuation of only the exhaust valve means positioned adjacent said first connecting passageway, whereby said fluid attached input valve means is fluid biased into a position blocking the continuous flow of pressurized fluid through the first end juncture of the second connecting passageway and the fluid attached back pressure valve means is fluid biased into a position allowing fluid to flow from a chamber of said servomotor directly through said second connecting passageway past the normally open exhaust valve means associated with the second connecting passageway and into an attached exhaust passageway; and second means having an end in fluid attachment with said second connecting passageway and a further end in joint fluid attachment with the input valve means and back pressure valve means slidably received in said first connecting passageway for conveying pressurized fluid from said second connecting passageway to said fluid attached input valve means and back pressure valve means in response to actuation of only the exhaust valve means positioned adjacent said second connecting passageway.

11. An apparatus according to claim 10, wherein each of said separate exhaust valve means comprises an exhaust valve assembly including a plunger and attached valve head assembly slidably positioned within a magnetic coil, each exhaust valve assembly being energized by a current passing through said coil, moving said plunger and attached valve head from the normally disengaged position to a position wherein said valve head contacts an interior wall surface portion of said end junction to prevent pressurized fluid from flowing into an attached exhaust passageway.

12. An apparatus according to claim 10, wherein each of said input valve means comprises a piston member slidably received in a separate enlarged fluid chamber formed in each of said first and second connecting passageways, each input valve means further comprises a substantially conically-shaped valve head attached to one end of a stem member whose opposite end is fixedly attached to one of said piston members.

13. An apparatus according to claim 10, wherein each of said back pressure valve means comprises a piston member slidably received in a further enlarged fluid chamber formed in each of said first and second connecting passageways, each back pressure valve means further comprises a substantially conically-shaped valve head attached to an end of a stem member whose opposite end is slidably received in a bore formed in one of said piston members.

* * * * *